United States Patent [19]

Baux et al.

[11] Patent Number: 5,085,078
[45] Date of Patent: Feb. 4, 1992

[54] DEVICE FOR MEASURING FUEL LEVEL IN A MOTOR VEHICLE TANK

[75] Inventors: Christian Baux, Levallois; Thierry Salaun, Montsoult, both of France

[73] Assignee: Jaeger, Perret, France

[21] Appl. No.: 537,644

[22] Filed: Jun. 14, 1990

[30] Foreign Application Priority Data

Jun. 15, 1989 [FR] France ................. 89 07949

[51] Int. Cl.$^5$ .............................. D01F 23/32
[52] U.S. Cl. ........................ 73/313; 73/317; 338/33
[58] Field of Search ............... 73/317; 338/33

[56] References Cited

U.S. PATENT DOCUMENTS

| 3,348,413 | 10/1967 | Zimmerle | 73/313 |
| 3,449,955 | 6/1969 | Stadelmann | 73/313 |
| 3,925,747 | 12/1975 | Woodward et al. | 73/313 X |
| 4,939,932 | 7/1990 | Ritzenthaler et al. | 73/313 X |

FOREIGN PATENT DOCUMENTS 3310704 5/1984 Fed. Rep. of Germany .

Primary Examiner—Daniel M. Yasich
Attorney, Agent, or Firm—Blakely Sokoloff Taylor & Zafman

[57] ABSTRACT

A device for measuring the level of fuel in a motor vehicle tank, the device being of the type comprising: a base for fixing to a wall of the tank; a support hinged about a horizontal axis to the portion of the base inside the tank; a shoe carried at the bottom end of the support so that the shoe rests against the bottom of the tank; a resistor element carried by the support; a float carried by an arm which is hinged about a non-vertical axis to the support to track the level of fuel; and a cursor carried by the arm and engaging the resistor element to define a resistance which varies as a function of the level of liquid contained in the tank, wherein the shape of the shoe is such that regardless of the position of the bottom of the tank, due to possible deformation of the tank, whenever the level of fuel corresponds to the same minimum measurable depth, the arm of the float always occupies the same position relative to the support.

14 Claims, 3 Drawing Sheets

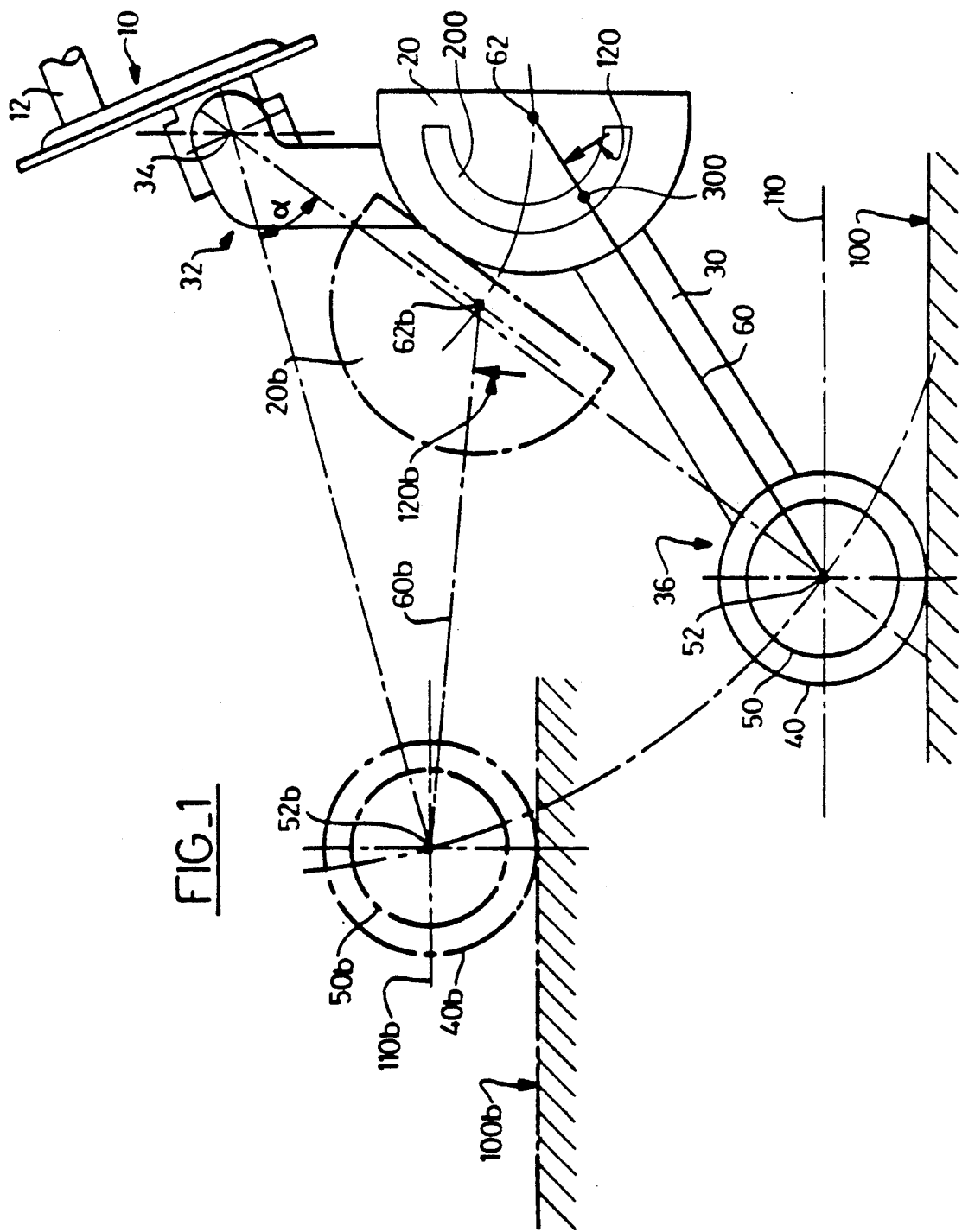
FIG_1

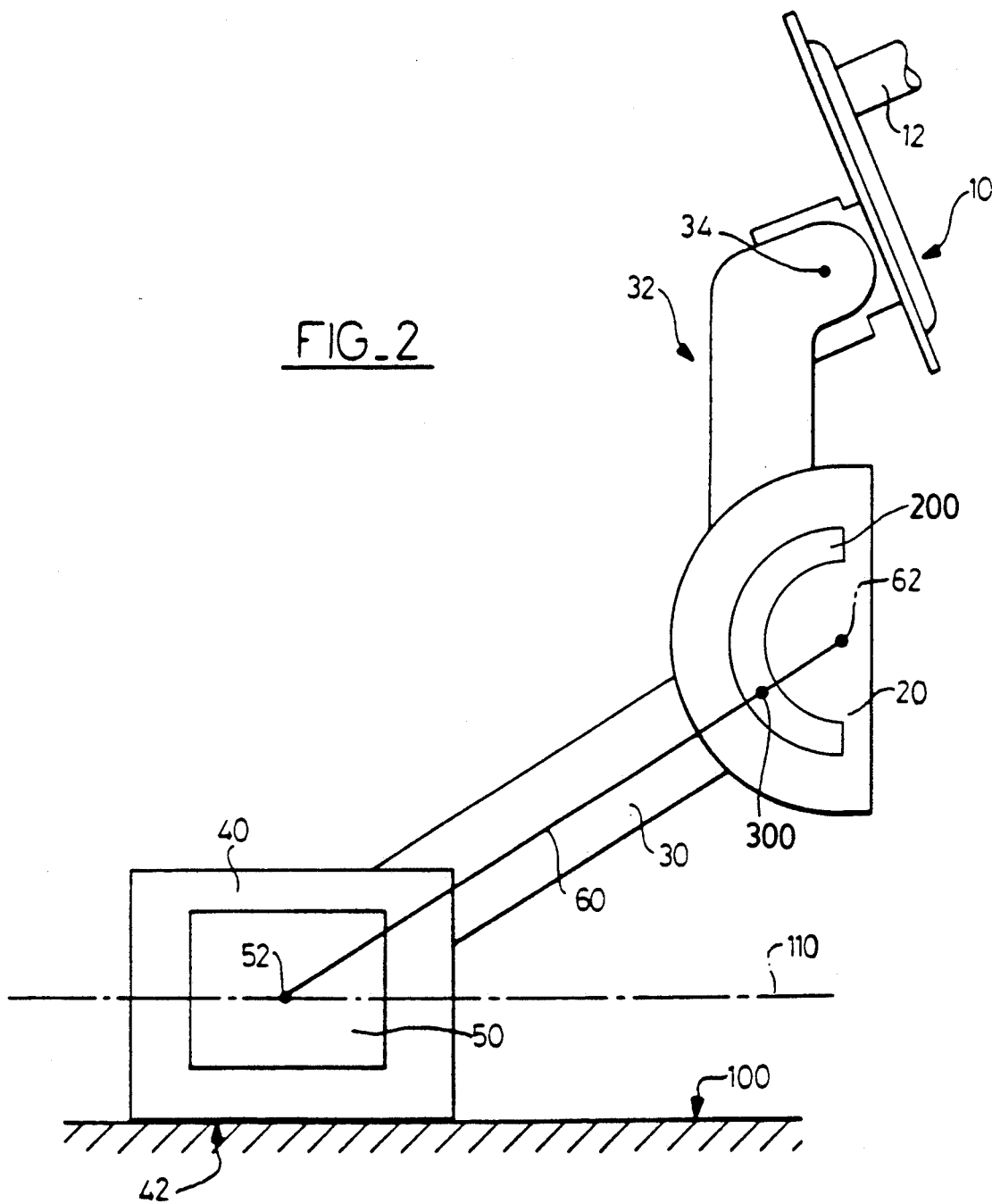

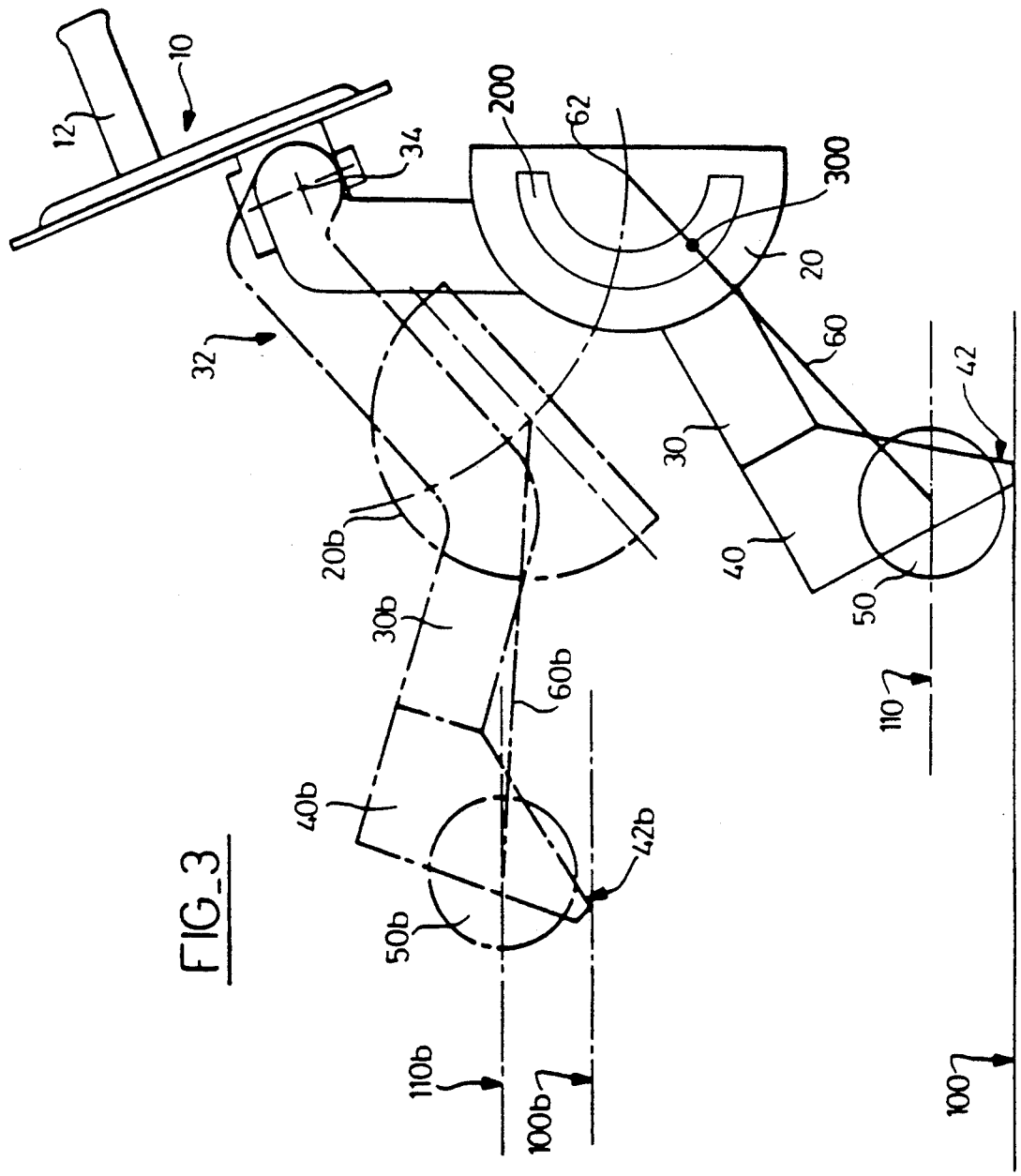
FIG_3

DEVICE FOR MEASURING FUEL LEVEL IN A MOTOR VEHICLE TANK

The present invention elates o a device for measuring fuel level in a motor vehicle tank.

BACKGROUND OF THE INVENTION

It relates more particularly to float and variable resistance devices using the bottom of the tank as a reference level and of the the comprising:

a base for fixing to a wall of he tank;

a support hinged about a horizontal axis to the portion of the base inside the tank;

a shoe carried at the bottom end of the support so that the shoe rests against the bottom of the tank;

a resistor element carried by he support;

a float carried by an arm which is hinged about a non-vertical axis to the support to track the level of fuel; and a cursor carried by the arm and engaging the resistor element to define a resistance which varies as a function of the level of liquid contained n the tank.

Such devices are described, for example. in patent documents U.S. Pat. No. 3,925,747, U.S. Pat. No. 3,449,95, and DE-C-3310704.

These devices may be called "bottom reference" devices.

Insofar as the support carrying the resistor element is urged to bear against the bottom of the tank, these bottom reference devices improve measurement accuracy over prior systems where the resistor element support is rigidly mounted on he wall of the tank.

However, the Applicant has determined that if additional precautions are not taken concerning the shape of the shoe, such prior bottom reference systems give rise to a small error which may be serious when measuring a minimum reserve quantity in the tank.

The object of the present invention is to improve devices of the above-specified type by improving their accuracy so that regardless of the position o the bottom o the tank due to possible deformation, the device o the present invention always provides the same "tank empty" signal when the level of fuel corresponds o the same minimum measurable depth above the bottom.

SUMMARY O THE INVENTION

This object is achieved by the present invention in a measurement device of the the defined above, wherein the shape of the shoe is such that regardless o the position of the bottom of the tank, due to possible deformation o the tank, whenever the level of fuel corresponds to the same minimum measurable depth, the arm of the float always occupies the same position relative to the support.

BRIEF DESCRIPTION OF THE DRAWINGS

Embodiments of the invention are described by way of example with reference to the accompanying drawings, in which:

FIG. 1 is a diagrammatic side view of a device in accordance with a preferred embodiment o the present invention; and FIGS. 2 and 3 are diagrams showing two variants of the device of the present invention.

DETAILED DESCRIPTION

Accompanying FIG. 1 shows a base 10, a resistor housing 20, a resistor housing support 30, a show 40, a float 50, and a float arm 60.

The base 10 is designed to be fixed to a wall of a tank, preferably a non-horizontal wall, e.g. a side wall of a fuel tank. It preferably carries electrical contacts connected to the resistor 200 provided in the housing 20. In conventional manner, the base 10 also has tubes passing there through, such as a suction tube 12. There are numerous different ways in which the bas 10 may be implemented, and it is not described in detail below.

The housing 20 houses a resistor element 200 which co-operates with a cursor 300 carried by the arm 60 and which rests on resistor 200 in order to define a contained in the tank.

The housing 20 is fixed rigidly on the support 30. The support 30 is essentially constituted by an elongate rod. As shown in the accompanying drawing, the drop need not be rectilinear, thereby facilitating insertion of the assembly into the tank.

The top end 32 of the support 30 rotates about a horizontal axis 34 on the portion o the base 10 which is inside the tank.

The axis 34 is thus in a fixed position.

The shoe 40 is fixed to the bottom end 36 of the support 30 (i.e. the end o the support 30 which is furthest from the base 10).

It is preferable for a resilient member (not shown in the accompanying figures in order to simplify the drawing) to be fixed to the base 10 in order to urge the support 30 downwards so that the shoe 40 rests permanently on the bottom 100 of the tank.

In this way, the detector assembly operates with reference to he bottom o the tank in conventional manner regardless of the position of the tank bottom, e.g. due to deformation.

The float 50 si fixed to a first end of the arm 60. The arm 60 is hinged at its second end to the housing 20 and rotates about an axis 62 which is non-vertical, and which is preferably horizontal. Thus, when the level of fuel in the tank varies, the float 50 tracks the level of fuel with the arm 60 pivoting about the axis 62 and thereby defining by means of its cursor 300a resistance which is representative of the fuel level or depth.

The arm 60 may be rectilinear as shown in the accompanying figure, however this condition is not essential.

In accompanying FIG. 1, reference 110 designates the minimum measurable depth o fuel which corresponds to an "empty" reading on the associated fuel gauge.

More precisely, solid lines in accompanying FIG. 1 show the position of the detector assembly when the bottom of the tank 100 is in its low position, and the same assembly is shown in dot-dashed lines and the references include an index "b" when the bottom o the tank is in its high position.

Deformation of the bottom of the tank from its low position 100 to its high position 100b causes the support 30 and the housing 20 which is fixed thereto to rotate through an angle.

As mentioned above, the assembly of the present invention is designed so that regardless o the position occupied by the bottom of the tank between positions 10 and 100b, the assembly always provides the same value of resistance, and thus the same "empty tank"

reading, whenever the level of the fuel si at the same minimum measurable depth above the bottom 100.

As mentioned above, this assumes that regardless of the position of the bottom of the tank 100, when the level of the fuel corresponds to the minimum measurable depth of fuel 110, the float arm 60 is always in the same position relative to he support 30 and the associated housing 20.

This condition is satisfied in the preferred embodiment shown in FIG. 1 by virtue of the following characteristics in combination: p the shoe 40 defines a bearing envelope on the bottom o the tank 100 which is circular and centered on a horizontal axis, i.e. the shoe 40 may be cylindrical or spherical, for example;

the radius o this circular envelope corresponds to the minimum measurable depth 110 above the bottom of he tank 100; and the center of buoyancy 52 of the float moves along a circular arc passing through he central axis of the circular envelope of the shoe, such that the center of buoyancy 52 of the float 5 is coaxial with the axis o the shoe 40 when the tank contains the minimum measurable depth 110.

In addition, the distance between the center of buoyancy of the float and the lowest point o the float 50 is not greater than the radius o the circular envelope of he shoe 40.

When defining a circular bearing envelope, the shoe 40 may either be rigidly fixed o the support 30 or else it may be hinged to rotate relative thereto about a horizontal axis which coincides with the center axis of he circular bearing envelope.

The shoe 40 need not necessarily define a circular bearing envelope on the bottom 100 of the tank providing it is hinged to the support 30 about a horizontal axis which is separated from its face that bearers against the bottom of the tank by a distance which is equal to the minimum measurable depth. The term "axis of rotation of the shoe 40" is used below in the present application to designate either the axis of the circular bearing envelope, or else the hinge axis connected the float to the support, as he case may be.

In accompanying FIG. 1, the float 50 is circular in vertical right cross-section (it may be a cylinder or a sphere, for example). The float may be fixed rigidly on he arm 60. In this case, the point wheel the arm 60 is fixed to the float 50 may be hinged on the arm 60 about a horizontal axis which coincides with the center of buoyancy 52 of the float 50.

In more general terms, when the float 50 is hinged to the arm 60 about a horizontal axis which coincides with its own center for buoyancy 52, then the shape of the float 50 may be arbitrary.

Accompanying FIG. 2 thus shows a variant embodiment, in which:

the shoe 40 has a vertical right cross-section which is rectangular in shape, it is hinged to the bottom end of the support 30 about a horizontal axis which is at a distance from its face 42 which bears against the bottom o the tank 100 equal to the minimum measurable depth; and the float 50 has a vertical right cross-section which is rectangular and is hinged to the arm 60 about a horizontal axis 52 which passes through the center of buoyancy of he float;

said center of buoyancy is coaxial with the hinge axis whereby the shoe 40 is connected to the support 30 when the level of fuel corresponds to the minimum measurable depth 110.

Naturally the present invention is not limited to the embodiments described above but extends to any variant that falls within its scope.

As shown in FIG. 3, it is possible, for example, to use a shoe 40 which defines a non-circular bearing envelope on the bottom of the tank 100, and a float 50 whose center of buoyancy is not centered on the shoe, providing the shape of the face 42 of the shoe 40 which rests against the bottom of the tank is appropriately adapted to that regardless of the position of the bottom of the tank, when the level of fuel corresponds to the minimum measurable depth, then the float arm 60 is always at least substantially in the same relative position relative to the support 30 and the associated housing 20.

Where appropriate, an abutment shown diagrammatically in accompanying FIG. 1 under reference 120 may be provided on the housing 20 for engaging the arm 60 and delimiting the bottom position of the arm 60 relative to the support 30.

The shoe 40 also acts as a friction abutment for the support of the resistance housing on the bottom and as a noise-reducing shock absorber.

We claim:

1. A device for measuring a level of fuel in a motor vehicle tank, the device being of the type comprising:
   a base for fixing to a wall of the tank;
   a support mounted to rotate about a horizontal axis on a portion of the base inside the tank;
   a shoe carried at the bottom end of the support so that the shoe rests against the bottom o the tank;
   a resistor element carried by the support;
   a float carried by an arm which is mounted to rotate about a substantially horizontal axis on the support to track the level of fuel; and
   a cursor carried by the arm and resting on the resistor element so as s to define between said cursor and an end of the resistor a resistance which varies as a function of the level of liquid connived in the tank,
   wherein the shoe is rigidly fixed on the support and defines a barring envelope on the bottom of the tank which is circular and centered on a horizontal axis, said bearing envelope having a radius relative to said horizontal axis which is equal to a minimum measurable depth level, and the float having a center of buoyancy which moves on a circular arc which is centered on the axis of rotation of said arm and passes through the horizontal axis of the bearing envelope of said shoe.

2. A device according to claim 1, wherein the center of buoyancy of the float lies on the horizontal axis of the shoe when he tank contains the minimum measurable depth.

3. A device according o claim 1, wherein the shoe is cylindrical or spherical.

4. A device according to claim 1, wherein the float is rigidly fixed to the arm.

5. A device according to claim 1, wherein the float is mounted to rotate on the arm about a horizontal axis which coincides with the center of buoyancy of the float.

6. A device according o claim 1, wherein the support carries an abutment serving to engage the arm in order to delimit a bottom position thereof relative to the support.

7. A device according to claim 1, wherein he support carries an abutment serving to engage the arm in order to delimit a bottom position thereof relative to the support.

8. A device for measuring a level of fuel in a motor vehicle tank, the device being of the type comprising:
   a base for fixing to a wall of the tank;
   a support mounted to rotate about a horizontal axis on a portion o the base inside the tank;
   a shoe carried at the bottom end o the support so that the shoe rests against the bottom of the tank;
   resistor element carried by the support;
   a float carried by an arm which is mounted to rotate about a substantially horizontal axis on he support to track the level of fuel; and
   a cursor carried by the arm and resting on the resistor element so as to define between said cursor and an end of the resistor a resistance which varies as a function of the level of liquid contained in the tank,
   wherein the shoe is mounted to rotate on the support about a horizontal axis which is at a distance equal to a minimum measurable depth rom its face that bears against the bottom of the tank, and the float having a center buoyancy which moves on a circular arc which is centered on the axis of rotation of said arm and passes through the horizontal axis of rotation of the shoe on the support.

9. A device according to claim 8, wherein the center of buoyancy of he float lies on the axis of rotation of the shoe on the support when the tank contains the minimum measurable depth.

10. A device according to claim 8, wherein the shoe defines a bearing envelope on the bottom of that tank which is circular and centered on a horizontal axis which coincides with the axis of rotation of the shoe.

11. A device according to claim 8, wherein the shoe is cylindrical or spherical.

12. A device according to claim 8, wherein the vertical right cross-section of the shoe is non-circular.

13. A device according to claim 8, wherein the float is frigidly fixed o the arm.

14. A device according to claim 8, wherein the float is mounted to rotate on the arm about a horizontal axis which coincides with the center of buoyancy of the float.

* * * * *

UNITED STATES PATENT AND TRADEMARK OFFICE
CERTIFICATE OF CORRECTION

PATENT NO. : 5,085,078
DATED : February 4, 1992
INVENTOR(S) : Baux et al.

Page 1 of 3

It is certified that error appears in the above-identified patent and that said Letters Patent is hereby corrected as shown below:

```
In column 1 at line 11 delete "the the" insert --the--;
at line 12 delete "he" insert --the--;
at line 19 delete "he" insert --the--
at line 24 delete "n the" insert --in the--;
at line 34 delete "he" insert -the--
at line 43 delete "position o" insert --position of--
at line 44 delete "o the" insert --of the--, both occurances;
at line 46 delete "o the" insert --to the--;
at line 52 delete "o the" insert --of the--
at line 54 delete "o the" insert --of the--;
at line 65 delete "o the" insert --of the--.

In column 2 at line 24 delete "o the" insert --of the--;
at line 28 delete "o the" insert --of the--;
at line 37 delete "he bottom o" insert --the bottom of--;
at line 58 delete "bottom o" insert --bottom of--;
at line 65 delete "o the" insert --of the--
```

UNITED STATES PATENT AND TRADEMARK OFFICE
CERTIFICATE OF CORRECTION

PATENT NO. : 5,085,078
DATED : February 4, 1992
INVENTOR(S) : Baux et al.

It is certified that error appears in the above-identified patent and that said Letters Patent is hereby corrected as shown below:

In column 3 at line 1 delete "si" insert --is--;
at line 11 delete "p", and the phrase which begins "the shoe 40 defines a bearing ..." begins a new sub-paragraph;
at line 12 delete "o the" insert --of the--;
at line 15 delete "radius o" insert --radius of--;
at line 16 delete "of he" insert --of the--;
at line 19 delete "he central" insert --the central--;
at line 21 delete "axis o" insert --axis of--;
at line 26 delete "o the circular envelope of he" insert --of the circular envelope of the--;
at line 29 delete "fixed o" insert --fixed to--;
at line 32 delete "of he" insert --of the--;
at line 43 delete "as he case" insert --as the case--;
at line 47 delete "he arm" insert --the arm--;
at line 61 delete "o the tank" insert --of the tank--;
at line 66 delete "of he float;" insert --of the float;--.

In column 4 at line 32 delete "bottom o" insert --bottom of--;
at line 38 delete "as s to" insert -- as to--;
at line 63 delete "o claim 1," insert --to claim 1,--.

UNITED STATES PATENT AND TRADEMARK OFFICE
CERTIFICATE OF CORRECTION

PATENT NO. : 5,085,078
DATED : February 4, 1992
INVENTOR(S) : Baux et al.

It is certified that error appears in the above-identified patent and that said Letters Patent is hereby corrected as shown below:

In column 5 at line 7 delete "portion o" insert -- portion of--;
at line 8 delete "end o" insert --end of--;
at line 10 before "resistor" insert --a --;
at line 12 delete "he support" insert --the support--;
at line 20 delete "depth rom" insert --depth from--.

In column 6 at line 17 delete "fixed o" insert --fixed to--.

Signed and Sealed this

First Day of August, 1995

Attest:

BRUCE LEHMAN

Attesting Officer

Commissioner of Patents and Trademarks